United States Patent [19]

Jakobs et al.

[11] 4,036,574

[45] July 19, 1977

[54] DEVICE FOR THE PRODUCTION OF CARBON BODIES

[75] Inventors: Willy Jakobs, Proz-Grengel; Kurt Wilkens, Cologne, both of Germany

[73] Assignee: Klockner-Humboldt-Deutz Aktiengesellschaft, Germany

[21] Appl. No.: 636,544

[22] Filed: Dec. 1, 1975

[30] Foreign Application Priority Data

Dec. 2, 1974 Germany .......................... 2456911

[51] Int. Cl.$^2$ .......................... B29C 3/00; B30B 11/02

[52] U.S. Cl. .......................... 425/432; 425/425

[58] Field of Search .............. 425/432, 456, 253, 256, 425/258, 425, 429, 431; 264/71, 72, 102, 104, 105, 119, 120

[56] References Cited

U.S. PATENT DOCUMENTS

| | | | |
|---|---|---|---|
| 3,555,599 | 1/1971 | Weinhold | 425/432 X |
| 3,610,316 | 10/1971 | Engel | 425/432 UX |
| 3,752,116 | 8/1973 | Kipple | 425/456 X |
| 3,824,060 | 7/1974 | Helmrich | 425/432 X |
| 3,899,281 | 8/1975 | Jakobs | 425/432 |
| 3,920,369 | 11/1975 | Boehringer | 425/253 |
| 3,932,099 | 1/1976 | Burdy | 425/432 |

*Primary Examiner*—Francis S. Husar
*Assistant Examiner*—John S. Brown
*Attorney, Agent, or Firm*—Hill, Gross, Simpson, Van Santen, Steadman, Chiara & Simpson

[57] ABSTRACT

A mechanism for the production of large molded carbon bodies such as electrodes for the aluminum industry including a mold box for a carbon body with a resilient support and an osciallating drive for the box with the support mounted on a frame movable by hydraulic means between a first charging position and a second compacting and jarring position with an overhead charging container above the box at the first position and a vertically movable compressing shoe at the second position with the fore and aft sides of the box removable to move the completed carbon body out of the box.

8 Claims, 1 Drawing Figure

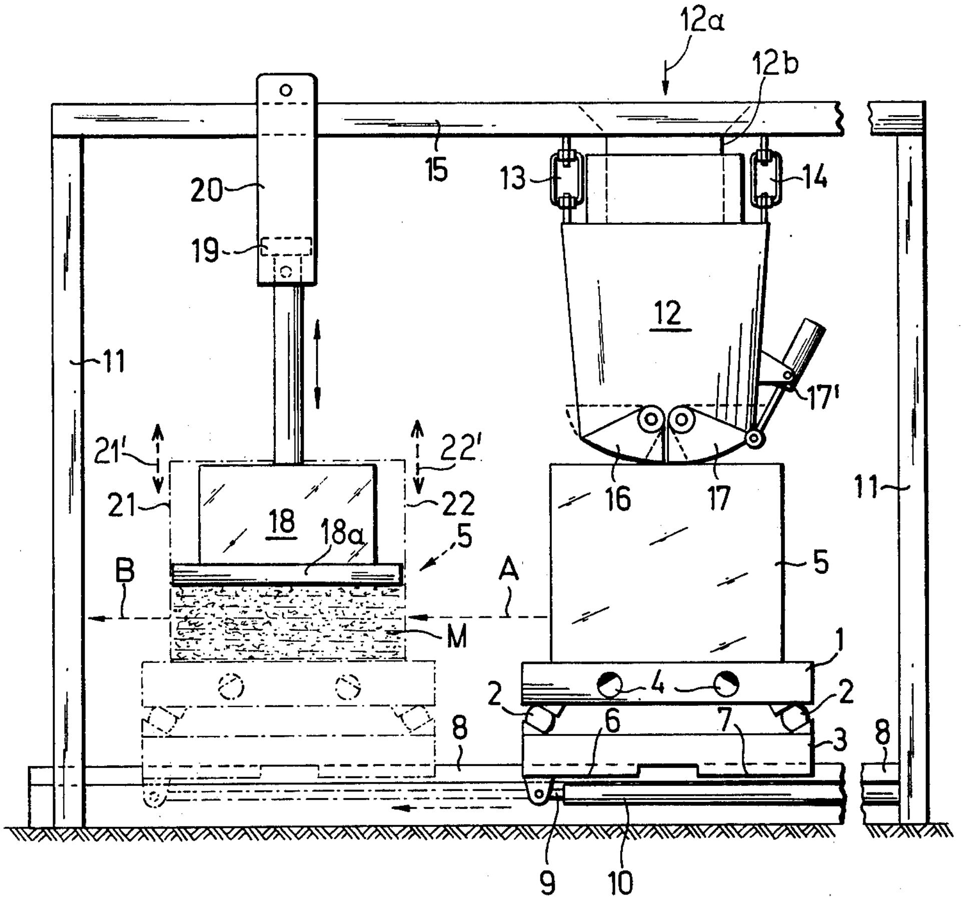
12a
12b
15
13
14
20
19
12
17'
11
21'
22'
21
22
16
17
11
18
18a
5
B
A
5
M
1
4
2
2
6
7
3
8
8
9
10

DEVICE FOR THE PRODUCTION OF CARBON BODIES

BACKGROUND OF THE INVENTION

The invention relates to a device for the production of molded carbon bodies such as electrodes for the aluminum industry. The mechanism embodies producing the carbon bodies by charging a mold box compressing and jarring the box for casting the carbon body and removing the body from the box.

Various structures have heretofore been devised for the production of large carbon bodies, and German Pat. No. 1,784,164 discloses a rotary table mechanism including individual operating steps for filling a mold, pressing and expelling the completed carbon electrode. The molding of carbon bodies, such as used for large electrodes, has been disclosed in earlier art such as German Gebrauchsmuster No. 1,951,457, and U.S. Pat. Nos. 3,606,633 and 3,610,316 illustrate devices of different structures for producing molded carbon bodies.

In accordance with the instant invention, a vibrating or jarring mold is provided which is moved between a first charging position and a second compressing and jarring position, although the mold box and its associated structure are arranged to be of simplified construction so that they are not destroyed or weakened by the jarring and vibration which is necessary, and yet adaptable to relatively rapid production techniques. Production mechanism such as shown in U.S. Pat. No. 3,610,316 embodying a rotary table are more expensive in construction and heavily constructed strong parts must be provided to take the vibrations which are present in order to be able to continue satisfactory operation without breakage or excessive debilitating water.

It is, therefore, an object of the present invention to provide an improved mechanism and method which makes possible the production of molded carbon bodies in a peculiarly simple and economical manner. In accordance with the invention, this object is accomplished by providing a vibrating support for a mold box wherein the vibrating mechanism is carried on a transportable frame slidably arranged to move laterally horizontal between a first charging position and a second jarring and compressing position. An improved material charging unit is provided which can relatively easily be brought into juxtaposition with the mold box for filling. The mold box is rapidly and easily moved to a second compressing and vibrating position at which position the third operative step which comprises the explusion or discharge of the finished carbon body is preformed. The present arrangement makes it possible for measuring the quantity of carbon material volumetrically without requiring a weighing scale or other complex equipment.

The supporting frame of the vibrating table is positioned on horizontally extending slide rails, and is moved between the two positions by a hydraulic sliding device. This accomplished movement of the mechanism with relatively small power equipment and low expenditure of energy.

An overhead frame is provided which supports the material charging unit, and this unit is constructed so that in a very simple manner, the volumetric quantity of carbon material filled into the mold box may be adjusted.

It is accordingly a further object of the present invention to provide an improved large carbon body molding device which avoids the disadvantages of structures heretofore available, and which provides for a more rapid production of molded carbon bodies and for the construction of bodies if improved quality by the use of production methods.

Other objects, advantages and features will become more apparent, as will equivalent mechanisms and methods which are intended to be covered herein, from the teachings of the principles of the invention in connection with the disclosure the preferred embodiment in the specification, claims and drawings, in which:

DRAWINGS

The single FIGURE of the drawings is an elevational view, shown partially in schematic form, of a mechanism constructed and operating in accordance with the principles of the present invention.

DESCRIPTION

The drawing shows a vibrating or jarring table 1 which is supported on resilient supports 2. The resilient supports may be of various types known to those versed in the art such as rubber supporting elements. These supporting elements 2 are carried on a frame 3. On the vibrating table 1 are unbalanced exciters 4 which may be rotating unbalanced weights driven by an electric motor through connections, not shown.

Various types of exciting mechanism may be employed of sufficient power to drive the mechanism in a jarring mechanism at a frequency and amplitude required for the particular product as will be fully recognized by those versed in the art.

Secured to the top of the jarring table 1 is a mold box 5 having dimensions to provide a molded carbon body of a predetermined size.

The frame 3 which supports the vibratory supports 2 is mounted to be transported horizontally and to carry the mold box between the solid line position 5 shown to the right of the drawing and the dotted line position 5 shown to the left of the drawing. The first position is the charging position wherein the carbon material if filled into the mold box 5, and the second position is the compression and jarring position where the carbon body is molded, and where it is ejected and removed from the mold box. For supporting the mechanism the frame bed 3 is mounted at each lateral side on horizontal slide rails 8 which are parallel to each other. Shoes 6 and 7 support the frame bed 3 on the rails so that it will slide between said first and second positions. The mechanism is power actuated to carry it between the positions and double acting cylinder 10 driving a piston rod 9, which is connected to the frame bed 3, is secured at its base end and is fitted with suitable hydraulic lines to move the mechanism on the rails 8 between the two positions.

In the first filling position, a charging unit container 12 is positioned above the box. The charging container is supported on an overhead frame having end columns 11 and a top rail 15 which is horizontal and substantially parallel to the lower rails 8. the charging container 12 is supported on adjustable overhead carrier links 13 and 14 mounted on the overhead beam 15. The links 13 and 14 are vertically adjustable so as to control the vertical position of the container 12 and thereby control the volumetric filling of the mold box 5 in a manner which will be described.

The charging container 12 is filled from overhead as shown schematically by the arrowed line 12*a.* Flow from the charging container is controlled by bucket shaped pivotal gates 16 and 17 which move together along their center in the closed solid line position shown. These gates are interconnected to move together simultaneously to an open dotted line position as shown in the drawing. The gates 16 and 17 are interconnected such as by segment gears, not shown, and operated by a pistion and cylinder unit 17' pivotally mounted on the container 12. When the gates are moved to open position, carbon material will flow down into the box 5 until it fills up to the level of the gates. At that time, the flow will be stopped by the material building up to the location of the gap between the gates, and then the gates can be moved back to closed position. For controlling the volume of material filled into the box 5, the container 12 and its associated mechanism is raised or lowered by shortening or lengthening the links 13 and 14. The arrangement 12*b* is provided for accommodating vertical movements.

The gates 16 and 17 of the container 12 are at a level so that they will not interfere with the box 5 as it is moved laterally to the second position, to the left as shown in the drawing.

In the second compressing and jarring position, a shoe 18*a* having an external dimension to fit into the interior of the box 5 is pressed down upon the carbon material M which is within the box. the shoe is carried at the lower end of a weight 18 which is supported on a raising and lowering device which is a double acting piston 20 driving a cylinder 19. The double acting piston is suspended from the beam 15 of the frame, and can be adjusted so that its position corresponds with the position of the box in its second position. When the box is moved to its second position and the carbon material compressed by the lowering of the shoe 18*a*, the vibrating exciters 4 are driven for a predetermined period of time to jar and compress the carbon material. When this operation is completed, the finished carbon body is slid out of the box by vertically raising the fore and aft sides 21 and 22 of the box. These sides are suitably mounted on the box for vertical movement such as by being slid into vertical ways or gibs, and they can be raised manually, but preferably by power means shown schematically by the broken arrowed lines 21' and 22'. Such power means may be in the form of double acting pistons and cylinders supported on the nonmovable walls of the box.

After the finished carbon body is moved out of the box, the slidable fore and aft walls 21 and 22 are again moved back down into their relocated position on the box, and the box assembly moved back to the first position to be recharged.

In summary of operation, when the box 5 is started in the first position which is the righthand solid position of the FIGURE, the gates 16 and 17 are opened, and a column of material pours down into the box. This column of material builds up in the box until the peak of the material fills up between the opening between the gates 16 and 17. At this time, the flow of material stops and the gates are closed by operation of the double acting cylinder 17'. The gates have a lateral dimension less than the box and are opened a limited distance so that the material doesn't overflow the upper edges of the sidewalls of the box. Thus, the vertical position of the container 12 will control the volume of material filled into the box.

As soon as the box is filled, it is moved to the second dotted line position of the FIGURE, and in that position, the compression of the batch of material located in the mold box takes place by the hydraulically operated shoe 18*a* being moved down into the top of the box to compress the material. After the termination of the compression operation, the shoe and its weight is lifted up to a height where it clears the upper edge of the box. The jarring and vibration of the box is then commenced for a predetermined amount of time. When this is completed, the sides 21 and 22 are raised, and the finished body M is moved laterally as indicated by the arrowed line B. When the completed body has been removed, the walls 21 and 22 of the box are dropped, and the box moved along the dotted line A back to the solid line position for a consecutive operation. This operation can be carried out automatically by the provision of control timers which operate the charging device and double acting cylinder 10 with the lowering cylinder and the vibratory exciters 4. Also, limit switches can be placed in the paths of travel of the frame 3, the gates 16 and 17, and the shoe 18*a* with the limit switches wired sequentially for automatic continuous operation. The operative steps, namely filling, compressing and jarring, and explusion are thus carried out sequentially and in relatively rapid production operational rates.

Variations in the structure and methods of the invention will become apparent to those versed in the art. For example, the container 12 may also be provided with a sliding plug for metering the amount of material placed into the box, and for this purpose, preferably the container 12 will have the same dimensions as the box 5 so that a charging plug of material will drop downwardly into the box 5. This will also involve a volumetric filling as is the case with the pivotal gates 16 and 17.

Thus, it will be seen that we have provided an improved mechanism and method which meets the objectives and advantages above set forth and provides an improved, rapid reliable operation.

We claim:

1. A mechanism for the production of carbon bodies such as electrodes for the aluminum industry comprising:
- a jarring table;
- a resilient mount therefor;
- an oscillation exciter attached to the table;
- a mold box arranged on the table;
- a base frame supporting the resilient mount;
- a horizonal slide supporting the base frame;
- a drive for horizontally sliding the base frame on the horizontal slide between fixed first and second positions;
- a material charging container above the mold selectively fixed vertically and fixed horizonally at said first horizontal charging position;
- an openable closure means carried on the charging container for metering by the selected vertical position of the container the flow of material from the charging container; and
- a pressing compression device and a compression weight fixed on said second position of the mold, whereby the mold box may be charged at the first position and the carbon material therein jarred and compressed at the second position; and wherein
- said horizontal slide is positioned to guide the container accurately between said first and second positions.

2. A mechanism for the production of carbon bodies as electrodes for the aluminum industry constructed in accordance with claim 1:

wherein said horizontal slide includes slide rails and said drive for moving the mold box between said first and second positions is an hydraulic actuator.

3. A mechanism for the production of large molded carbon bodies such as electrodes for the aluminum industry comprising in combination:

a mold box of a shape and size to form a carbon body of predetermined dimensions and having an open top;

a resilient support for said box;

a charging unit positioned above the mold box and having metering door means for filling the box with loose carbon material in a continuous stream;

a conveying frame arranged below said box and carrying the resilient support;

horizontally extending guide means for said frame for guiding movement of the box between a first filling position and a second jarring and compressing position;

power conveying means for moving the box between said first and second positions;

a vertically reciprocal compressing shoe moveable into the box compressing the material at said second position and moveable out of said box;

and vibrating means mounted in and driving the mold box in a jarring motion for forming the carbon body at said second position prior to the body's being removed from the box and the box moved to said first position for recharging.

4. A mechanism for the production of large molded carbon bodies such as electrodes for the aluminum industry constructed in accordance with claim 3.

wherein said power conveying means is in the form of a double acting hydraulic cylinder.

5. A mechanism for the production of large molded carbon bodies such as electrodes for the aluminum industry constructed in accordance with claim 3:

including an overhead horizontal frame supporting said charging unit and supporting said compressing shoe.

6. A mechanism for the production of large molded carbon bodies such as electrodes for the aluminum industry constructed in accordance with claim 3:

wherein said charging unit has a pair of lower pivotal doors which join at an intermediate location in a closed position and which pivotally move apart for charging the mold box.

7. A mechanism for the production of large molded carbon bodies such as electrodes for the aluminum industry constructed in accordance with claim 3;

wherein said mold box has movable fore and aft walls for removing the carbon bodies from the box after they have been molded.

8. An apparatus for the production of carbon bodies such as electrodes for aluminum production, the apparatus comprising:

a jarring table;

a vibratory means mounted in said table;

resilient support means carrying said table;

an open-top mold box affixed atop said table;

a base frame supporting the resilient supporting means;

a horizontal slide mounting said base frame, supporting means, vibratory means, table, and mold box;

a power means for moving the base frame and mold box between first and second positions;

a pair of walls on said mold box removeable at said second position;

a material charging container fixed horizontally at said first position and an adjustable distance above said mold box, the container being connected to a continuous supply of carbon material;

at least one openable door means mounted on a lower end of said charging container for dividing said material into portions inside said container and inside said mold box after stoppage of a flow of material into said box; and a weighted compression ram fixed as said second position and enterable into said mold box, whereby said box is chargeable at said first position by opening the door means of the container a selected distance until a flow of material into the container stops, then closing the door means to leave a quantity of material in the mold box, and the material in the box is compacted at the second position by actuation of said vibratory means and said ram, and the formed body is removed horizontally from the mold box at the second position by momentarily removing said two walls of the box, whereupon the box is returned to the first position for refilling in a second cycle.

* * * * *